Sept. 11, 1962  G. STEINMEYER  3,052,972
INSERTING TOOL FOR SCREW THREAD INSERTS
Filed Jan. 2, 1959  2 Sheets-Sheet 2
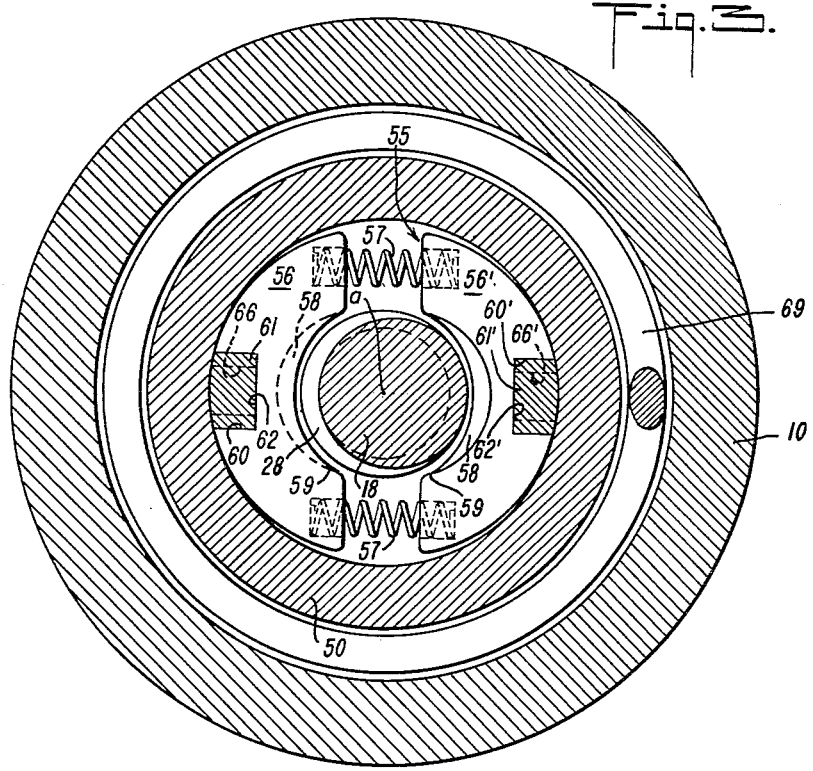
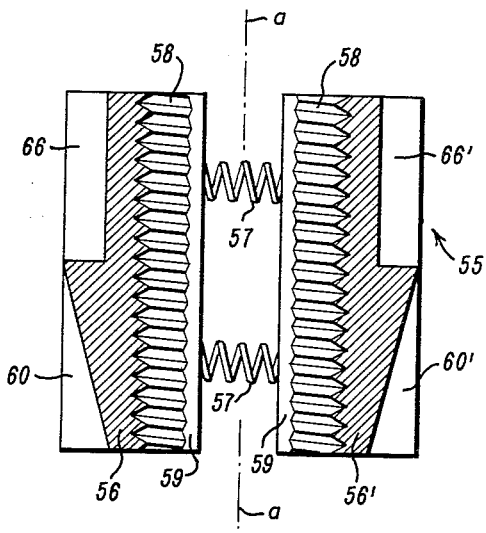
INVENTOR.
GERHARD STEINMEYER.
BY *Walter S. Pleston*
ATTORNEY.

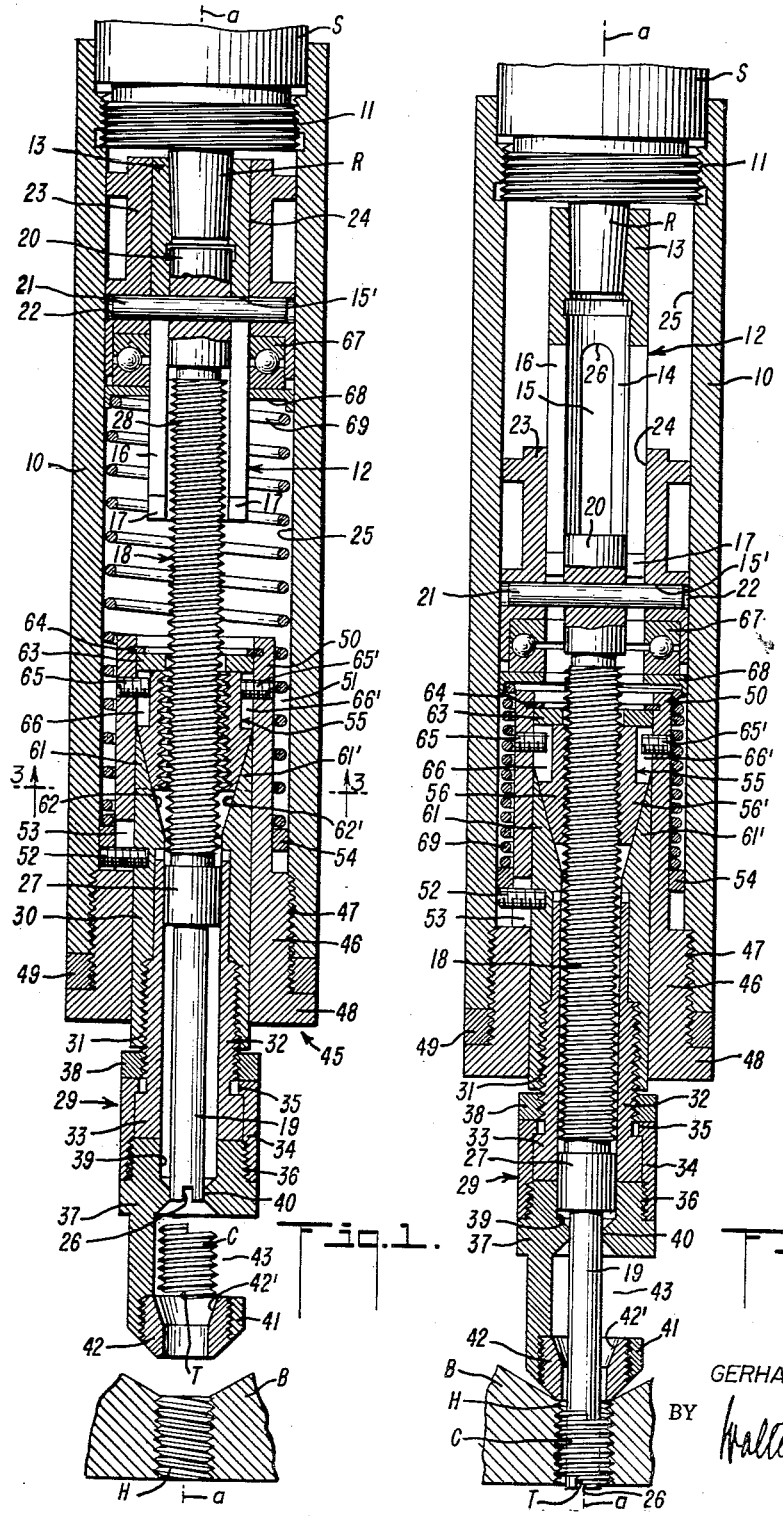

United States Patent Office
3,052,972
Patented Sept. 11, 1962

3,052,972
INSERTING TOOL FOR SCREW THREAD INSERTS
Gerhard Steinmeyer, Heepen, near Bielefeld, Germany, assignor to Heli-Coil Corporation, Danbury, Conn., a corporation of Delaware
Filed Jan. 2, 1959, Ser. No. 784,699
10 Claims. (Cl. 29—240.5)

The invention relates to an inserting tool for wire coil screw thread inserts. Inserts of this type are usually wound oversized and must be contracted by a tool for installation. In order to render the engagement of such insert by an inserting tool possible, the one end convolution is conventionally provided with a grip e.g. with a diametrically extending tang which can be grasped by a slotted mandrel. Tools hitherto designed and used for the indicated purpose, especially if power driven, did not always satisfy, particularly when the inserts have a relatively high degree of flexibility and the mandrel is advanced merely owing to its gravity so as to follow the insert in the axial direction during the installation of the latter.

The invention aims to avoid the drawbacks of the conventional devices and to provide a tool including a mandrel which during the installation of the gripped insert is rotated and positively advanced in the axial direction according to the pitch the insert is intended to have after the insertion.

Another object of the invention is the provision of a tool of the mentioned kind including means for coupling the mandrel to a power drive and means for disconnecting the coupling means when the insert has been installed to a predetermined depth.

Another object of the invention is the provision of a tool comprising a prewinder and a power driven mandrel cooperating therewith wherein a pressure on the prewinder causes the mandrel to advance and a release of the pressure causes the mandrel to return to an inoperative position.

The invention also aims to provide in a tool of the mentioned type a screw threaded mandrel and a non-rotatable sectioned nut engageable with and disengageable from the thread of the mandrel in order to cause an axial movement of the mandrel during its rotation in response to a shift of the prewinder.

Further objects and details of the invention will be apparent from the description given hereinafter and the accompanying drawing illustrating an embodiment thereof by way of example.

In the drawing:

FIG. 1 is a longitudinal section of a tool according to the invention in the position of rest, FIG. 2 is a similar section of the tool at the end of an inserting operation, FIG. 3 is a cross-section along line 3—3 of FIG. 1, on a larger scale, and FIG. 4 is a longitudinal section through a part of the tool, also on a larger scale.

Referring now to the drawing, the illustrated tool comprises a tubular housing 10 which can be secured, for instance by an inner screw thread 11 near its one end, to a stationary part S of a power source, such as an electric motor, the rotor shaft of which extends with its cone-shaped end R into the interior of the housing 10. A substantially tubular coupling member of constant outer diameter and in general denoted by 12 has one portion 13 interiorly cone-shaped so as to fit tightly the cone-shaped shaft end R. The other portion 14 of the member 12 is provided with four longitudinal slots 15 which extend to the free end of the member 12 and define therebetween four tongue-like projecting pieces or prongs 16 which may have bevelled end faces 17. A mandrel 18 is located co-axially within the housing 10 beyond which the foot end 19 of the mandrel projects at the end opposite the power source R,S. The mandrel has a head 20 fitting between the prongs 16 and carrying a pin 21 which is passed diametrically therethrough. The pin is preferably of square or rectangular cross-section. Its portions directly adjacent the mandrel head fit into a pair of opposite slots 15 and the pin ends are located in bores 22 provided in the wall of a slider 23. The slider fits with its inner cylindrical surface 24 the outer surface of the member 12, and with its outer surface the inner surface 25 of the housing 10. Thus, as clearly apparent from FIG. 1, the mandrel has an inner end position when the pin 21 abuts against the ends 15' of the engaged slots 15, and it will also be clear that if the mandrel is shifted in the axial direction it will be rotated by the driving shaft R until the pin 21 leaves the slots 15 and becomes disengaged from the prongs 16 of the member 12, as shown in FIG. 2. In other words, the part 14 of member 12 and the pin 21 constitute a disengageable coupling between the shaft end R and the mandrel 18.

The foot end 19 of the mandrel is provided with means to grip the remote, correspondingly formed end of an insert such as an insert C through which the mandrel is to be projected in order to screw it into the tapped hole H of a boss B or the like. In the illustrated form the insert C shown in FIG. 1 in position to be gripped by the mandrel foot end, is provided with a diametrical tang T of its end convolution and the mandrel foot portion 19 is provided at its end with a slot 26 for engagement with the tang T. Adjacent the foot portion 19 the mandrel has a portion 27 of larger diameter. Intermediate the portion 27 and the head 20, the mandrel is screw threaded, as shown at 28. This thread 28 has an outer diameter not larger than portion 27 and a pitch according to that which the insert is intended to have in the hole H. A prewinder assembly, in general denoted by 29, is provided in order to contract, with the aid of the mandrel, a conventionally oversized insert before it is screwed into the tapped hole so as to seat springingly in the latter after being released when its installation is completed. The illustrated prewinder assembly comprises a first tubular part or prewinder holder 30 which is interiorly threaded at its outer end at 31. Into this end an exteriorly threaded hollow plug 32 is screwed which has a flange 33 at its outer end. A cap nut 34 engages with its inner flange 35 the flange 33 of the plug 32 and secures with its thread 36 the prewinder foot 37 so that the latter bears against the end face of the plug 33. A ring nut 38 acting as a jam nut is screwed on the thread of the plug 33 between the prewinder holder 30 and the cap nut 34. The plug 33 and a portion 39 of the prewinder foot provide guiding faces for the portion 27 of the mandrel and a portion 40 of the prewinder foot having a reduced inner diameter guides the mandrel foot portion 19. The free end 41 of the prewinder foot holds a prewinder ring 42, which has an inner taper 42' of a major diameter similar to that of a non-contracted insert to a minor diameter equal to that to which the insert is to be contracted for installation. This taper may be screw threaded with a pitch equal to that of the thread 28 of the mandrel. Between ring 42 and the portion 40, the foot 37 is provided with a lateral recess 43 forming a chamber into which an insert C can be charged before it is engaged from the inside by the mandrel grasping the tang T and screwing it through the prewinder ring 42.

It will be noted that the screw connection of the parts of the prewinder assembly permits a peripheral adjustment of the position of the recess 43. This adjustability renders it possible to turn the prewinder foot so that the inserts can be charged from the most convenient side.

The prewinder assembly 29 is shiftable a limited distance in the axial direction within a sleeve 45 inserted in the housing 10 from the end opposite the drive of the mandrel. The sleeve 45 has a portion 46 provided with an exterior screw thread 47 in engagement with a corresponding interior thread of the housing. Between the housing end and an end flange 48 of the sleeve 45 a ring shaped jam nut 49 may be screwed on the thread 47. By screwing portion 46 in or out, the depth can be changed to which the insert will be installed. Jam nut 49 serves to secure the portion 46 in the tubular housing 10. From portion 46, a portion 50 of the sleeve extends further inwards. The portion 50 has the same inner diameter as the portion 46 but an outer diameter smaller than the inner diameter of the housing so that a ring space 51 is formed between portion 50 and the casing 10. In order to prevent the prewinder assembly from rotating while permitting a limited axial shifting, a pin 52 is screwed into the prewinder holder 30 and projects radially into a longitudinal recess or slot 53 in the portion 50 of the sleeve 45. The pin 52 extends into the space 51 so that a washer-like ring 54 can bear against that pin. It is, of course, possible to provide a plurality of such pins and grooves to prevent, if necessary, a tilting of the ring 54, the purpose of which will be explained later on.

Means are provided to shift the mandrel according to the pitch of the screw threaded portion while it is rotated by driving the shaft R. For this purpose, a nut, in general denoted by 55 (see FIGS. 3 and 4), is located within the portion 50 of the sleeve 45. The nut comprises two sections 56 and 56′ spread apart by springs 57 when the tool is inoperative, and in this position the sections bear against the inner surface of the sleeve portion 50, as shown in FIGS. 1 and 3. The nut sections are interiorly threaded at 58 so that the nut thread can properly engage the mandrel thread when closed against the restraint of the springs 57. As clearly shown in the enlarged illustration of FIG. 3, the thread of the nut sections is cut away on the sides at 59, so that, in the disengaged position the nut sections are entirely out of engagement with the mandrel thread. Facing the prewinder assembly the nut sections are provided with longitudinal grooves 60 and 60′, respectively, which have an inclined bottom, as clearly apparent from FIG. 4. Into these grooves two finger-like projections 61 and 61′ extending from prewinder holder 30 engage with corresponding inner faces 62 and 62′, respectively. The opposite ends of the nut sections bear against a thrust ring 63 visible in FIGS. 1 and 2 which in turn bears against a spring ring 64 inserted into the free end of the sleeve section 50. Now it will be clear that a shift of the prewinder assembly from the position of FIG. 1 towards the left-hand side into the position of FIG. 2 will close the nut sections about the mandrel on account of the cooperating inclined faces of the fingers 61 and 61′ with the inclined bottoms of the grooves 60 and 60′, respectively, and that upon a shift of the prewinder assembly from the position of FIG. 2 to FIG. 1 the springs 57 will urge the nut sections apart so as to cause their disengagement from the mandrel. As stated hereinbefore, the prewinder holder 30 is prevented from rotating due to the cooperating pin 52 and groove 53. Consequently, the fingers 61 and 61′ bearing against the side-walls of the grooves 60 and 60′ will in turn prevent the nut from rotating. Additional means may be provided for the same purpose. In the illustrated embodiment such means consist of pins 65 and 65′ engaging in grooves 66 and 66′, respectively, which are provided in the nut sections and extend to the end of the nut remote from the prewinder.

Thus, if the nut sections are closed about the mandrel while the latter is rotated, the mandrel will be shifted axially according to the pitch of the threaded portion 28 until the pin 21 of the mandrel head becomes disengaged from the coupling part 14. Means are provided to cause a re-engagement of the mandrel coupling in order to return the mandrel to its initial position. For this purpose the slider 23 carries, at its end facing the sleeve 45, a thrust bearing, preferably an anti-friction bearing 67 which supports a ring 68 inside the housing 10. A compression spring 69 bears with its ends against ring 68 and the aforementioned ring 54. This spring tends to urge the prewinder assembly and the mandrel in opposite directions.

The tool according to the invention operates in the following manner. An insert C having been inserted into the chamber 43, as in FIG. 1, the tool is placed on the boss B co-axially with the tapped hole H. An axial pressure will now be exerted on the tool from the side of the drive whereby the prewinder assembly is shifted inwards to close the nut 55 about the threaded mandrel portion 28. The drive may be switched on to start the rotation of the mandrel before or after the closing of the nut. The non-rotatable nut will now shift the rotating mandrel through the insert C and into engagement of its slot with the tang T whereupon the mandrel will screw the insert through the foot ring 42 of the prewinder assembly into the hole H of the boss B. During this movement the head of the mandrel slides along the slots 15 engaged by the pin 21 simultaneously causing compression of the spring 69. When the pin 21 reaches the end of the slots 15 and thus becomes disengaged from the coupling part 14 the rotation of the mandrel stops. At this time the insert will have reached the desired depth in the hole H which depth had been predetermined by a longitudinal adjustment of the portion 46 with the aid of the jam nut 49. If now the tool is withdrawn from the boss or other job B, spring 69 will project the prewinder assembly until pin 52 reaches the end of the slot 53. This allows the nut 55 to open. Thereby, the mandrel will be released and spring 69 will now urge the mandrel towards the coupling part 14 so that pin 21 can re-enter a pair of opposite slots 15 and the starting position of the parts will again be reached.

It will be apparent to those skilled in the art that many modifications and alterations of the structure illustrated and described hereinbefore can be made without departure from the spirit and essence of the invention which for that reason shall not be limited but by the scope of the appended claims.

I claim:

1. In a tool of the character described comprising in a co-axial arrangement a mandrel having a foot end, a head end and an intermediate screw-threaded portion and being axially shiftable between a retracted and a projected end position, a non-rotatable prewinder assembly through which said mandrel is projectable with its foot end into its projected end position, the combination of a disengageable coupling having a first part and a second part, said first part being substantially tubular and adapted to be connected with its one end portion to a power drive and having its other end portion provided with a plurality of slots so as to form prongs of substantial length extending parallel to the axis of said mandrel towards the foot thereof between which prongs the mandrel head can enter, said second part consisting of transverse projections of said mandrel head adapted to engage said prongs when said mandrel is retracted and to be disengaged from said first part when said mandrel is in its projected end position, a non-rotatable nut split along its longitudinal axis into a plurality of sections and encompassing said threaded mandrel portion and including a first resilient means tending to hold said sections disengaged from said mandrel, and second means co-operating with said nut sections and said prewinder assembly and responsive to an axial shift of said prewinder assembly towards said mandrel head to close said nut sections so as to engage the mandrel thread whereby said nut will cause a shift of the rotating mandrel from its retracted into its projected end position.

2. A tool as in claim 1, said nut sections being each provided with a groove having an inclined bottom and said prewinder assembly including two finger-like projections having each an inclined face in engagement with the bottom of one of said grooves.

3. A tool as in claim 1 comprising a compression spring intermediate said mandrel head and said prewinder assembly and tending to shift said prewinder assembly in the direction of said mandrel foot thereby to cause disengagement of said nut sections from said mandrel, and tending also to cause engagement of said coupling and to shift said mandrel into its retracted end position.

4. A tool as in claim 1, said first part of said coupling consisting of a tubular member having its one end portion interiorly cone-shaped to receive therein the cone-shaped end of the drive shaft of a motor, and having its other end portion longitudinally slotted so as to constitute said coupling elements, and said mandrel head including a transverse pin adapted to engage in a pair of opposite slots of said other end portion.

5. A tool as in claim 1 further comprising a stationary tubular housing including a sleeve encasing said nut and a portion of said prewinder assembly, and a groove and pin connection between said sleeve and said prewinder assembly whereby the latter is non-rotatably but axially shiftable a limited distance in said sleeve.

6. In a tool of the character described comprising in co-axial arrangement, a tubular housing, a mandrel extending through said housing and having a head and a foot end formed for gripping a grip end of a wire coil insert to be applied with said tool, the combination of a disengageable coupling having a first part and a second part, said first part being substantially tubular and adapted to be connected with its one end portion to a power drive and having its other end portion provided with a plurality of slots so as to form prongs of substantial length extending parallel to the axis of said mandrel towards the foot thereof between which prongs the mandrel head can enter, said second part consisting of transverse projections of said mandrel head adapted to engage said prongs when said mandrel is retracted and to be disengaged from said first part when said mandrel is in its projected end position, a prewinder assembly including a prewinder foot and projecting with said foot from the interior of said housing, said assembly being telescopically shiftable but non-rotatable relatively to said housing between an inner and an outer end position, said mandrel being guided in said prewinder assembly and projectable with its foot end through said prewinder foot and having a screw threaded portion intermediate its ends, and a nut split along its longitudinal axis into a plurality of sections non-rotatably and non-shiftably located interiorly of said housing so as to encompass said threaded mandrel portion and including first resilient means tending to spread said nut sections apart so as to hold them disengaged from said mandrel, and second means being part of said prewinder assembly and co-operating with said nut sections to cause engagement of said nut sections with the thread of the mandrel when an axial thrust from the exterior in the direction towards the mandrel head is exercised on the prewinder assembly thereby to shift said mandrel when rotating from its retracted to its projected position, and a compression spring between said prewinder assembly and the head of said mandrel to shift the mandrel into its retracted position and said prewinder assembly into its outer end position thereby causing said nut to open when said thrust is relieved.

7. A tool as in claim 6, further comprising a sleeve secured in said housing and encasing said nut and a portion of said prewinder assembly, and a pin and groove connection between each nut section and said sleeve whereby said nut sections are non-rotatable but axially shiftable a limited distance in said sleeve.

8. A tool as in claim 6, further comprising a sleeve secured in said housing to the lower portion thereof and including a reduced portion leaving a ring space between said portion and said housing, a pin secured to said prewinder assembly and extending through a longitudinal groove provided in said sleeve into said ring space, a ring bearing on said pin in said ring space, said compression spring located at least partly in said ring space and bearing with one of its ends against said ring and with its other end against the head structure of said mandrel.

9. A tool as in claim 6, said mandrel head including a slider in guided engagement with and shiftable in said housing, a thrust bearing carried by said slider, said compression spring acting with its one end on said thrust bearing and with its other end on a part stationary with respect to said prewinder assembly.

10. A tool as in claim 6 wherein said foot of said prewinder assembly forms a laterally open chamber to receive therein an insert to be screwed through the free end of said foot, said prewinder assembly further comprising a first tubular element with fingerlike extensions having inclined faces co-operative with inclined faces of said nut sections for causing their engagement with the thread of the mandrel, and a second tubular element, said second element forming a screw connection between said first element and said foot for adjustably changing the total length of the prewinder assembly and for adjustably varying the peripheral position of said chamber opening.

References Cited in the file of this patent
UNITED STATES PATENTS

| | | |
|---|---|---|
| 2,305,637 | Ricciardi | Dec. 22, 1942 |
| 2,390,524 | Eckener | Dec. 11, 1945 |
| 2,681,582 | Valvano | June 22, 1954 |
| 2,832,129 | Forster | Apr. 29, 1958 |
| 2,855,661 | Forster | Oct. 14, 1958 |